(12) United States Patent
Kiest, Jr.

(10) Patent No.: US 9,562,339 B2
(45) Date of Patent: *Feb. 7, 2017

(54) APPARATUS AND METHOD FOR SEALING PIPES AND UNDERGROUND STRUCTURES

(71) Applicant: LMK Technologies, LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,370

(22) Filed: Sep. 23, 2015

(65) Prior Publication Data

US 2016/0053456 A1 Feb. 25, 2016

Related U.S. Application Data

(63) Continuation of application No. 14/107,042, filed on Dec. 16, 2013, now Pat. No. 9,169,957, which is a continuation of application No. 13/490,195, filed on Jun. 6, 2012, now Pat. No. 8,640,737, which is a continuation-in-part of application No. 12/962,276, filed on Dec. 7, 2010, now Pat. No. 8,240,340.

(51) Int. Cl.
| | | |
|---|---|---|
| *F16L 55/16* | (2006.01) | |
| *E02D 29/12* | (2006.01) | |
| *F16L 55/179* | (2006.01) | |
| *F16L 55/163* | (2006.01) | |
| *F16L 55/18* | (2006.01) | |

(52) U.S. Cl.
CPC .......... *E02D 29/128* (2013.01); *F16L 55/163* (2013.01); *F16L 55/179* (2013.01); *F16L 55/18* (2013.01); *Y10T 29/49826* (2015.01)

(58) Field of Classification Search
CPC ... F16F 55/163; F16F 55/179; E03F 2003/065
USPC ....... 138/98, 97; 405/184.2, 150.1; 156/287, 156/293, 294; 264/568, 269
See application file for complete search history.

(56) References Cited

U.S. PATENT DOCUMENTS

| | | |
|---|---|---|
| 3,781,966 A | 1/1974 | Lieberman |
| 5,368,075 A | 11/1994 | Baro |
| 5,587,126 A | 12/1996 | Steketee, Jr. |
| 5,738,146 A | 4/1998 | Abe |
| 5,863,975 A * | 1/1999 | Whitton ............... C04B 28/001 524/445 |
| 5,879,501 A | 3/1999 | Livingston |
| 5,915,419 A | 6/1999 | Tweedie |
| 6,068,725 A | 5/2000 | Tweedie |
| 6,328,310 B1 | 12/2001 | Chikaraishi |
| 6,541,106 B1 | 4/2003 | von Fay |
| 6,641,688 B1 | 11/2003 | Gearhart |

(Continued)

*Primary Examiner* — Patrick F Brinson
(74) *Attorney, Agent, or Firm* — Nyemaster Goode, P.C.

(57) ABSTRACT

An apparatus and method for sealing pipes or underground structures is provided. In one embodiment, the end of a pipe is sealed by the use of a pipe liner and a sealing member. The sealing member may be a hydrophilic material, a hydrophobic material, a compressible material, or a paste. The sealing member is held in place by a mechanical fastener and a liner is installed adjacent the sealing member and against the wall of the pipe or other structure to be sealed. In another embodiment, a manhole is sealed by the use of a sealing member, a mechanical fastener, and a manhole liner.

17 Claims, 9 Drawing Sheets

(56) References Cited

U.S. PATENT DOCUMENTS

| | | |
|---|---|---|
| 6,651,699 B2 | 11/2003 | Kweon |
| 6,994,118 B2 | 2/2006 | Kiest, Jr. |
| 7,094,308 B1 | 8/2006 | Gearhart |
| 7,131,791 B2 | 11/2006 | Whittaker |
| 7,670,086 B2 | 3/2010 | Kiest, Jr. |
| 7,846,251 B2 * | 12/2010 | Aldykiewicz, Jr. ..... C04B 28/02 106/696 |
| 7,892,349 B2 * | 2/2011 | Hill ......................... C04B 18/08 106/705 |
| 8,240,340 B2 | 8/2012 | Kiest |
| 8,240,341 B2 | 8/2012 | Kiest, Jr. |
| 8,640,737 B2 | 2/2014 | Kiest |
| 9,169,957 B2 * | 10/2015 | Kiest, Jr. ............... F16L 55/179 |
| 2005/0241713 A1 | 11/2005 | Kaneta |
| 2006/0130922 A1 | 6/2006 | Kamiyama |
| 2009/0056823 A1 | 3/2009 | Kiest, Jr. |
| 2009/0194184 A1 | 8/2009 | Kiest, Jr. |
| 2010/0018631 A1 | 1/2010 | Kiest, Jr. |
| 2014/0102577 A1 | 4/2014 | Kiest |

* cited by examiner

APPARATUS AND METHOD FOR SEALING PIPES AND UNDERGROUND STRUCTURES

CROSS-REFERENCE TO RELATED APPLICATIONS

This application is a continuation of U.S. patent application Ser. No. 14/107,042 filed Dec. 16, 2013, which is a continuation of U.S. patent application Ser. No. 13/490,195, filed Jun. 6, 2012, now U.S. Pat. No. 8,640,737, which is a continuation-in-part of U.S. patent application Ser. No. 12/962,276, now U.S. Pat. No. 8,240,340, filed on Dec. 7, 2010, which are herein incorporated by reference in their entirety.

FIELD OF THE INVENTION

The invention relates generally to an apparatus and method for repairing or sealing a manhole or other underground structure, the junction between the manhole or other underground structure and a pipe in fluid communication therewith, or the end of a buried pipe, such as underground sewer pipe and the like. More particularly, but not exclusively, the invention relates to a kit, apparatus, and method to seal a pipe, an underground structure such as a manhole, or a junction using liners in conjunction with a sealing member using a mechanical fastener to hold the sealing member in place during liner installation.

BACKGROUND OF THE INVENTION

As the infrastructure of major cities and towns in the developed world age, the sewer systems weaken. Pipe degradation, system blockage, water infiltration, and sewer leakage are major problems that aging sewer systems experience. As these problems persist, the sewer system may eventually experience total failure and entire sections of the sewer system may collapse. As a result, sinkholes may form and sewers may back up into homes and places of business. One method of addressing this critical infrastructure problem is the use of pipe lining techniques to rehabilitate existing sewer systems.

Cured-in-place pipelining is one such technique that includes rehabilitating an existing sewer system by creating a new pipe within an existing pipe. A liner, impregnated with a resinous material capable of curing and hardening, is inverted or pulled into a damaged pipe or structure. The liner is pressed against the wall of the existing pipe, and the resinous material is allowed to cure and harden. The result is a replacement pipe having the older pipe or "host pipe" on the exterior. The cured-in-place pipe acts to alleviate the problems caused by structural defects and blockages in the existing sewer system. Even in sewer systems where the main pipes have been rehabilitated with a cured-in-place pipe or other pipe liners, problems still arise. Some of those problems are caused by shrinkage of the pipe liner and unsealed areas at the pipe ends, the pipe junctions, or the manholes and other adjoining structures.

Shrinkage of a pipe liner after installation presents a problem for the longevity and effectiveness of a sewer system or other pipeline. Most materials experience some shrinkage after installation within an existing pipe. Once the pipe liner material has been installed, an annulus between the host pipe and the pipe liner is created due to this shrinkage of the material or due to surface irregularities of the pipe. The amount of shrinkage by a pipe liner depends on the materials used, the thickness of the liner, the depth of the pipe, the ambient temperatures, as well as several other factors. This shrinkage allows water and debris to enter into the pipe system from the ground surrounding the pipes, allows effluent to escape into the ground surrounding the pipes, and allows roots from surrounding vegetation to enter the annulus between the host pipe and the pipe liner.

The problem of shrinkage of a cured-in-place pipe has been addressed previously in the art. U.S. Pat. Nos. 6,641,688 and 7,094,308 to Gerhart teach methods of sealing the annular space formed between existing sewer pipes and cured-in-place pipes. Gerhart discloses placing an unactivated sealant at points of future liner ports and causing the sealant to be activated to form an annulus gasket after installation of the liner through application of a curing means to the rehabilitative liner. Specifically, Gerhart teaches spraying an expandable material to an existing main pipe before the application of a cured-in-place liner at or near the future liner ports. Heat is then added to the material to expand the material while the cured-in-place liner is installed, filling the annular space. There are several problems with this method. First, the step of spraying the material onto the pipe may be time consuming and the sprayed-on material may fall off of the pipe or sag to the bottom of the pipe due to gravity. Second, there is no way of determining whether the expandable material has expanded sufficiently into the annular space during the curing process, as the liner obstructs the view of the annular space. Third, the step of spraying the material onto the pipe is imprecise as there may be areas of the main pipe that receive too much or too little expandable material resulting in an uneven wall thickness. Additionally, the sprayed-on material may be moved by ground water leaking through cracks into the pipe. Therefore, there is a need in the art for an improved process and apparatus for sealing the annular space formed between existing sewer pipes and pipe liners.

In sewer systems where the main pipes have been rehabilitated with a cured-in-place pipe, unsealed connections at service and manhole junctions create problems. An unsealed connection is generally a product of installing a pipe liner within the main pipe, then using a cutting tool on the pipe liner at the connection to reinstate service. Current methods are described for example in U.S. Pat. Nos. 5,587,126; 6,641,688; and 7,131,791, which are all incorporated by reference in their entirety. Once service is reinstated to the service pipes by the use of the cutting tool, the service pipes may still include leaks, cracks or other structural defects that allow infiltration or exfiltration of fluids or sediment at or around the junction of the main and service pipe. The service pipe and junction with the main pipe may be further sealed or rehabilitated by installing a second pipe liner to seal the junction. Known methods of repairing and sealing the junction of a main and service pipe where the main pipe has been rehabilitated with a pipe liner include, for example U.S. Pat. Nos. 5,915,419; 6,068,725; and 6,651,699, which are all incorporated by reference in their entirety. The issue of repairing a junction of a main and service pipe has also been previously addressed in U.S. Pat. No. 6,994,118 and U.S. Pat. Pub. 2009/0056823, which are hereby incorporated by reference in their entireties. In these publications, a band or o-ring made of hydrophilic material is used to create a seal between a host pipe and a cured-in-place pipe liner at the junction between a main pipe and a lateral or service pipe.

Once the main pipe and the junctions of the main and service pipes have been rehabilitated and sealed, the manhole and the junction of the main pipe and the manhole (or "main pipe/manhole junction") remain at risk for allowing unwanted infiltration or exfiltration of fluids and sediment.

Conventional manholes include a lower or bottom pan, a barrel with a diameter no greater than the adjacent pan, a concentric or eccentric cone extending upwardly from the barrel, one or more adjusting rings to adjust the overall height of the manhole, and a casting frame on top of the adjusting rings to support a lid at an elevation substantially level with the surrounding pavement. Manholes may be used for many purposes, including acting as catch basins for storm water drainage, providing access to buried pipelines, junction chambers at the intersection of sewer lines, and constructing reservoirs or wetwells for pump stations. As such, the manhole structure is a critical point to seal within the sewer system because it is an area that is inundated with fluids and sediment. The issue of sealing a manhole utilizing cured-in-place pipelining techniques has been previously addressed in U.S. Pat. No. 7,670,086 and U.S. Pat. Pub. 2010/0018631, which are hereby incorporated by reference in their entireties. However, unless the junction between the manhole and sewer pipe is properly sealed, ground water will continue to run along the main pipe until it can enter the sewer system where the main pipe joins the manhole. This holds true of other underground or below-grade structures in fluid communication with pipes, including vaults, spillways, or drainage basins. Additionally, in a conventional manhole, the areas between the bottom pan, the barrel, the cone, and the adjusting rings are prone to experiencing water infiltration and exfiltration even when a manhole liner has been installed.

There have also been attempts in the art to seal the junction of a manhole and a main pipe. For example, U.S. Pat. No. 5,879,501 discloses the use of a tubular form inserted into the main pipe at a manhole junction. The manhole is then sprayed with a cement or polymer, the tubular form is removed, and the main pipe is lined with a cured-in-place pipe. This method is time consuming, requires the use of a tubular member to act as a mold for the area around the junction, does not address the problem of annular space around the pipe liner, and does not create a fluid-tight seal around a substantial area of the main pipe/manhole junction. With such a method, it is unclear how to fully seal the junction of a manhole and a main pipe, as the shrinkage of the cured-in-place pipe will still allow ground water to infiltrate the annular space.

Additionally, there are deficiencies to other known methods of sealing pipe junctions when applied to the junction of a manhole and a pipe. For example, the use of a band or o-ring as taught by U.S. Pat. No. 6,994,118 and U.S. Pat. Pub. 2009/0056823 would result in imprecise placement within the host pipe, as the flexible o-ring or band may shift within the pipe or fall during placement of a pipe liner. Another example of material used to seal pipe junctions includes a hydrophilic rope. One sample of hydrophilic rope is a product sold under the trade name Waterstop-Rx® in the United States by the Cetco company. The use of such a rope to seal the junction of a manhole and a pipe would result in imprecise placement within the host pipe, as there are no structural elements allowing the flexible rope to remain in place. Furthermore, the use of such a rope would not provide a complete seal, because the rope would be unconnected at its ends, allowing water or other fluid to track along the edge of the rope and leak at the point where the ends abut.

Therefore, a need in the art exists for an apparatus and method for effectively sealing a manhole, a pipe, or the junction between a buried pipe, such as a sewer pipe, and a manhole or other underground structure.

SUMMARY OF THE INVENTION

It is therefore a primary object, feature, and/or advantage of the present invention to provide an improved apparatus and method for repairing or sealing a pipe, a manhole, or the junction between a buried pipe and an underground structure that overcomes deficiencies in the prior art.

It is another object, feature, and/or advantage of the present invention to provide a seal to both a portion of the interior of the buried pipe and the adjoining wall of the manhole.

It is another object, feature, and/or advantage of the present invention to prevent the infiltration of water within a manhole by sealing the areas between the bottom pan, the barrel, the cone, and the adjusting rings of a manhole by using a sealing member in conjunction with a manhole liner.

It is another object, feature, and/or advantage of the present invention to provide an apparatus and method for repairing a pipe, a manhole, or the junction between a pipe and a manhole which is economical to manufacture, easy to install, and durable in use.

It is another object, feature, and/or advantage of the present invention to provide an improved method and apparatus for repairing the junction of a pipe and a manhole that provides a compression seal to the majority of the area at the junction.

It is another object, feature, and/or advantage of the present invention to provide an end seal for repairing the end of a pipe that provides a compression seal to the majority of the area at the pipe end.

It is another object, feature, and/or advantage of the present invention to provide a sealing member for use in conjunction with a pipe or manhole liner to repair or seal an area prone to experiencing water infiltration where the sealing member may be a compressible material, an absorbent material, or a hydrophilic or hydrophobic rubber or grout.

It is another object, feature, and/or advantage of the present invention to provide a sealing member in the form of a tubular sleeve that is retained in the pipe or manhole by a mechanical fastener, where the tubular sleeve may be installed in a pipe or manhole with minimal movement during a pipe or manhole liner installation, and where the tubular sleeve is made in a controlled setting to have a specified and consistent wall thickness.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, an assembly for sealing a pipe end is provided. The assembly includes a sealing member having an outer profile approximately equal to a pipe diameter; a mechanical fastener adapted to retain the sealing member against a wall of the pipe end; and a pipe liner. The sealing member may be a tubular sleeve that is constructed of or impregnated with a hydrophilic or hydrophobic material. In one embodiment, the sealing member is a hydrophilic neoprene rubber having a hardness of less than 90 Shore A Durometer Scale. The hydrophilic material may be such that the sealing member is collapsible, but capable of being placed back into an initial tubular conformation. In embodiments where the sealing member is a tubular sleeve, the tubular sleeve may include a flange attached to at least a portion of an end thereof.

According to another aspect of the present invention, an assembly for sealing a manhole is provided. The assembly includes at least one sealing member having an outer profile approximately equal to at least one manhole inner diameter; a mechanical fastener adapted to retain the sealing member against a wall of the manhole; and a manhole liner. The sealing member may be constructed of or impregnated with a hydrophilic or hydrophobic material. In one embodiment, the sealing member is a hydrophilic neoprene rubber having a hardness of less than 90 Shore A Durometer Scale. In other embodiments, the sealing member is an absorbent material capable of receiving a grout or resinous material capable of sealing a crack or fissure within a structure. The grout or resinous material capable of sealing a crack or fissure within a structure may be hydrophilic or hydrophobic. In other embodiments, the sealing member may be a paste capable of curing to seal a crack or fissure within a structure. The sealing member may be a tubular sleeve made of a material that is collapsible, but capable of being placed back into an initial tubular conformation against the wall of the manhole.

According to another aspect of the present invention, methods for using the assemblies for sealing a pipe end or a manhole are provided. The methods include providing the assembly for sealing a pipe end and placing the sealing member within the pipe, where a proximal end of the sealing member is aligned with the pipe end. The pipe liner is placed against an inner wall of the sealing member. Alternatively or in combination, an assembly for sealing a manhole is provided and a sealing member is placed against a wall of the manhole at an area prone to water infiltration. A manhole liner is placed against the walls of the manhole and the sealing member, creating a seal at the areas prone to water infiltration within the manhole.

DETAILED DESCRIPTION OF EMBODIMENTS

The present invention relates to an apparatus and method for repairing or sealing a manhole or other underground structure, the junction between a manhole or other underground structure and a pipe in fluid communication therewith, or the end of a buried pipe, such as underground sewer pipe and the like. The end of a pipe is sealed with the use of a pipe liner and a sealing member. Alternatively, a manhole or other underground structure is sealed by the use of one or more sealing members and a manhole liner.

The following definitions of terms are employed throughout the specification and claims:

A "pipe liner" is defined as a material that is used to provide a lining to a pipe. Pipe liners include but are not limited to cured-in-place pipe liners, folded liners, or spray-on liners.

A "cured-in-placepipe liner" is a fabric capable of holding a resinous material.

A "folded liner" is a material constructed of a thermoplastic, such as High Pressure Polyethylene ("HPPE"), High Density Polyethylene ("HDPE"), Medium Density Polyethylene ("MDPE"), Polyvinyl Chloride ("PVC"), and/or modified PVC that is used to provide a lining to pipes.

A "main liner" or "main pipe liner" is defined as a pipe liner for use inside of a main sewer pipe.

A "manhole liner" is defined as a material that is used to provide a lining to a manhole. Manhole liners include but are not limited to cured-in-place manhole liners, spray-on manhole liners, cementitious manhole liners, cast-in-place manhole liners, and resin manhole liners.

A "cured-in-place manhole liner" is a fabric capable of holding a resinous material.

A "spray-on liner" is defined as a material that is used to provide a lining to a manhole or pipe where the material is sprayed onto the walls of the manhole or pipe.

A "cementitious liner" is defined as a cement material that is used to provide a lining to a manhole. Cementitious liners may usually be sprayed, spread, or otherwise placed onto the walls of the manhole.

A "resin liner" is defined as a resinous material that is used to provide a lining to a manhole. Resin liners may be sprayed, spread, or otherwise placed onto the walls of the manhole.

A "service pipe" is defined as a pipe that is lateral to a main pipe.

Figure 1:
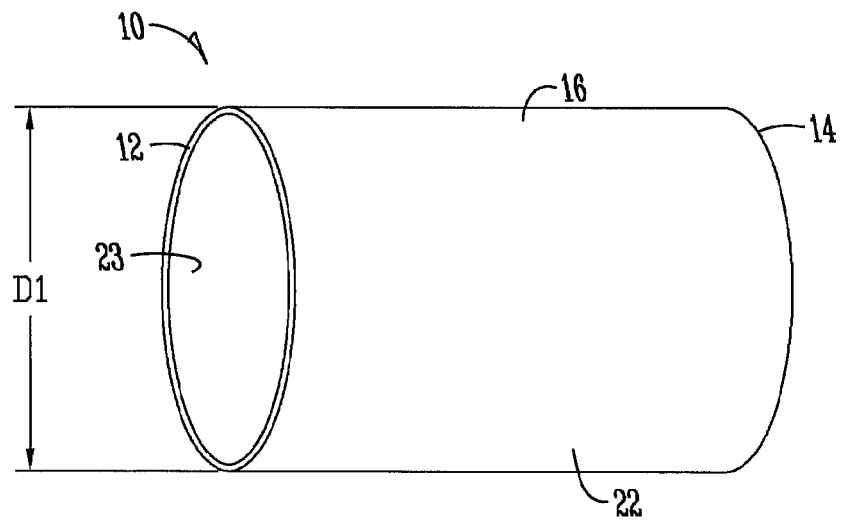
FIG. 1 is a perspective view of a sealing member in accordance with a first embodiment of the present invention.

Referring now to the figures wherein like numerals refer to like parts, FIG. 1 is a perspective view of a sealing member 10 in accordance with a first embodiment of the present invention. The sealing member 10 is depicted as a tubular sleeve having a proximal end 12, a distal end 14, a body 16 therebetween, and an outer wall 22 having a diameter D1. The sealing member 10 may be a single, unitary piece that may be made by vulcanization processes. Such methods include wrapping or extruding polymeric material around a mandrel and placing the loaded mandrel into a vulcanizing autoclave for a predetermined period of time. A vulcanization method is preferred for the sealing member 10, because the material may be formed in a tube of considerable length to be cut into shorter sealing members. Such a method would decrease the cost of producing the sealing member 10 compared to other methods, allowing for the simultaneous production of a plurality of units. Other methods of forming the sealing member 10 include casting or molding methods, including but not limited to resin casting, injection molding, blow molding, or extrusion molding. The sealing member 10 may be produced in units of preferably 1-8 inches and most preferred 5-7 inches in length when used for sealing a pipe end. However, it should be noted that for large diameter pipe (greater than 24 inches in diameter), the sealing member may be longer, depending on the application and desired sealing capabilities. The diameter of the sealing member 10 can be any diameter needed to seal a structure.

The sealing member 10 should be less than about 10 mm in thickness, with 2-3 mm most preferred. In embodiments where the sealing member 10 is a tubular sleeve, the sleeve is preferably produced directly in the form of a tube. However, it should also be appreciated that alternative constructions of a tube are possible, such as where a sheet of material is formed into a tube and fused together by thermal bonding, sewing, adhesives, or other mechanical bonding methods. It should also be noted that the sealing member 10 may be formed by taking a sheet of material and forming it into a tube by overlapping the ends, and then securing the tubular form within the pipe. Therefore, a bonded, continuous tube is not required to practice this invention. However, the body 16 preferably comprises a generally uniform wall thickness along the length of the sealing member. It should also be noted that the sealing member 10 may have a non-tubular or otherwise irregular configuration.

Sealing member 10 may be made of a compliant material, including but not limited to rubber, polyurethane, or other polymers. For certain embodiments, sealing member 10 comprises an absorbent material, such as an open-cell foam or sponge material capable of receiving a grout or resinous material capable of sealing a crack or fissure within a structure, such as a manhole or pipe. The sealing member 10 is preferably made of or impregnated with a hydrophilic material capable of swelling in response to being exposed to water or other liquid, such as an uncured hydrophilic polyurethane resin, paste, or grout. Such a material is preferred when the junction to be sealed experiences or is at risk of experiencing water infiltration, as the hydrophilic material will expand in the presence of water and extrude through voids or cracks in the passageway, thus creating a full compression seal. For examples of additional hydrophilic materials for use as seals, see U.S. Pat. Nos. 6,328,310, 6,541,106, or 6,994,118, which are all incorporated by reference in their entireties. Hydrophobic materials such as a hydrophobic polyurethane resin, paste, or grout may be used as well. Other materials for the sealing member 10 found suitable include neoprene rubber, other similar gasket materials such as urethane or silicone rubber, and other compressible materials. A feature of the sealing member 10 is that the material comprising the sealing member may be of such a hardness that the sealing member 10 is be able to maintain its original shape within the structure to be rehabilitated, such as a manhole or main pipe. For certain materials, it is possible retain the sealing member in place without the use of a mechanical fastener. As such, the sealing member 10 may be considered to be self-supporting within the pipe or other structure in such embodiments. When an elastomer is the base material used for the sealing member, the material of the sealing member of the present invention has a hardness between 0 Shore A Durometer Scale and 80 Shore D Durometer Scale. It is preferred that such an embodiment of the sealing member has a hardness of less than 90 Shore A Durometer Scale. Another feature of the sealing member 10 is that outer diameter D1 is approximately equal to a diameter of the structure into which it is to be included, i.e. the end of a buried sewer pipe. The sealing member may be retained within the end of the pipe by utilizing a mechanical fastener before a pipe liner is placed against the walls of the pipe. The same concept is applied to manholes or other structures, as the sealing member may be formed or adjusted in shape or diameter to conform to the inner profile of the manhole to be lined.

Figure 2:
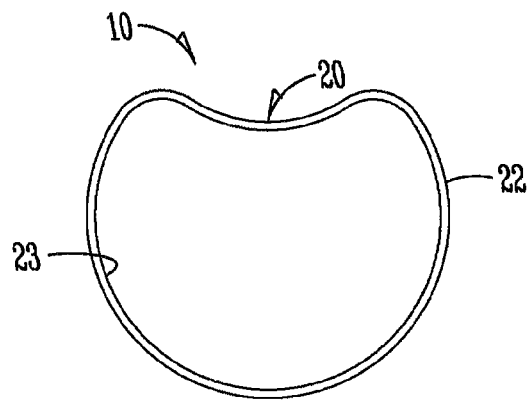
FIG. 2 is a sectional view of the sealing member of FIG. 1 while placed in a strained conformation.
Figure 3A:
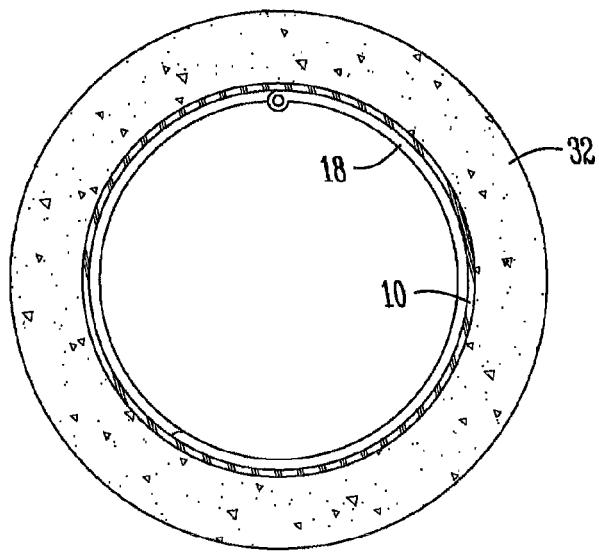
FIG. 3A is a cross-sectional view of a pipe illustrating the sealing member of FIG. 1 placed inside of a pipe, where a mechanical fastener is utilized to secure the sealing member in the pipe.
Figure 3B:
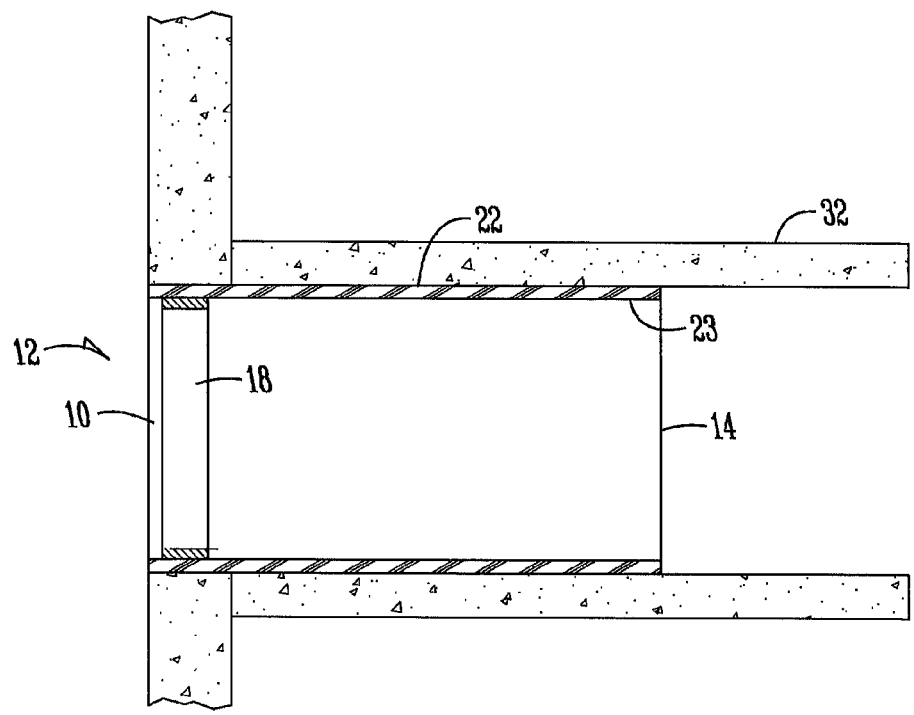
FIG. 3B is a sectional view of the sealing member and mechanical fastener of FIG. 3A within a pipe.

In certain embodiments, the sealing member 10 may have the properties of an elastomeric material, having the ability to undergo deformation under the influence of a force and regain its original shape once the force has been removed. As such, the sealing member 10 may be deformed from an initial conformation to a strained conformation. In the strained conformation, the outer profile of the sealing member 10 is reduced to fit into the structure to be sealed, such as a pipe or manhole. As shown in FIG. 2, a force acts on the sealing member 10 such that the body is folded over itself to reduce the outer diameter D1 of the sealing member 10. Once the sealing member 10 is placed into the end of the pipe, the elastomeric material is allowed to return to its initial tubular conformation. Since the outer diameter D1 of the sealing member 10 is approximately equal to a diameter of the pipe, the sealing member 10 will sit within the pipe. If the sealing member 10 is not self-supporting, a mechanical fastener 18 may be placed on the interior of the sealing member 10 to press or secure it against the interior of the pipe end, to avoid the need for an operator to hold the sealing member 10 in place during installation of a pipe liner, as is shown in FIGS. 3A and 3B.

FIG. 2 is a sectional view of an embodiment of the sealing member 10 while placed in a strained conformation. In the strained conformation, the sealing member 10 includes a strained portion 20 along the length of the sealing member that allows the outer profile of the sealing member 10 to be reduced, allowing an easier insertion of the sealing member 10 into the pipe.

The subsequent illustrated embodiments include where the buried pipe is a main sewer pipe and the underground structure is a manhole. However, the end of any other pipe, such as a lateral pipe, a service pipe, a fresh water pipe, a pressure pipe, a gravity pipe, an oil pipe, or natural gas pipe is within the scope of this invention. Additionally, the pipe end may be formed by cutting an existing pipe to provide access to a pipeline, while the methods and apparatus of the disclosed embodiments may be utilized absent a junction, manhole, or other underground structure. Additionally, any other underground structure similar to a manhole is intended to be within the scope of this invention, including a vault, a spillway, or a drainage basin.

Furthermore, the subsequent illustrated embodiments further show where the pipe liner and manhole liner are cured-in-place liners. However, it should be understood that any other type of pipe liner or manhole liner is within the scope of this invention. For example, the pipe liner may be a cured-in-place liner, a folded liner, or a spray-on liner. The manhole liner may be a cured-in-place manhole liner, a spray-on manhole liner, a cementitious manhole liner, a cast-in-place manhole liner, and/or a resin manhole liner. Where the sealing member is a compressible material, it is preferred to use a liner that is installed under pressure to impart a compressive force to the sealing member, forming a compression seal after installation of the liner.

FIG. 3A is a cross-sectional view of a pipe showing the sealing member 10 within an end of a pipe 32, where a mechanical fastener 18 placed against the inner wall 23 of the sealing member 10 is holding the sleeve in place. The mechanical fastener 18 should be capable of holding the sealing member 10 against the pipe 32. In one embodiment, the mechanical fastener may be a retaining ring capable of radially expanding. The retaining ring may be a piece of flat metal formed into a generally circular shape having its ends held together with a pin. An operator places the sealing member 10 within the pipe 32, places the mechanical fastener 18 within the sealing member 10, and removes the pin. Removal of the pin will allow the mechanical fastener 18 to radially expand against the inner wall of the sealing member 10, pressing the outer wall of the sealing member 10 against the inner wall of the pipe 32. As such, the retaining ring may have an expanded or final diameter similar to the host pipe.

Alternatively, such a retaining ring may be constructed of a shape memory alloy or metal and fabricated to have an initial diameter roughly equivalent to the pipe diameter or sufficient to firmly hold the sealing member in place. The shape memory alloy may be deformed under pressure to fit a smaller diameter, placed within the sealing member, and allowed to return to its initial pre-stressed conformation to hold the sealing member 10 in place against the pipe. Any other mechanical fastener capable of holding the sealing member 10 in place is contemplated for use with this invention. For example, a ratcheting ring, a hose clamp, a hydraulic ring, or any other retaining ring that keeps the sealing member 10 in an open state within the pipe 32 may be utilized. Other mechanical fasteners that may be used include screws, nails, or anchors. It should be noted that the mechanical fasteners contemplated for use with this invention should be constructed of a rust-resistant material or a material that has been treated with a rust/oxidation inhibitor. It should also be noted that if the mechanical fastener or retaining ring includes a portion that protrudes into the pipe (such as a worm gear or screw), the area of protrusion should be oriented so that pipe flow is not obstructed (as shown in FIG. 3A). Such an orientation may generally be described as near the top of the pipe interior.

FIG. 3B is a sectional view of the sealing member 10 and mechanical fastener 18 of FIG. 3A within a pipe 32. FIG. 3B shows the use of a circular, cylinder shaped mechanical fastener 18 placed near an end of the sealing member 10. While the length of the mechanical fastener 18 is shown to be substantially less than the length of the sealing member 10, it should be appreciated that the length of the fastener 18 could be the same or even longer than the length of the sleeve 10. In addition, it should be noted that when using a fastener such as shown in FIG. 3B, it should be of minimal thickness to avoid blockage. The thickness of the mechanical fastener 18 in this and all the figures is exaggerated to show placement and structure of the component. In FIG. 3B, the thin mechanical fastener 18 is placed at or near the proximal end 12 of the sealing member 10. In this embodiment, the mechanical fastener 18 is placed at the proximal end 12 because the pipe liner to be installed within the pipe will invert through the pipe through the proximal end 12 of the sealing member 10 and toward the distal end 14. Therefore, a major role of the mechanical fastener 18 is to ensure that the pipe liner easily aligns with and travels through the sealing member 10 during installation. If the mechanical fastener 18 is not used, the sealing member 10 may sag or move within the pipe during a pipe liner installation, resulting in misplacement of the sealing member 10 within the pipe. As such, it may be said that the mechanical fastener is placed near the leading end of the sealing member 10. The leading end of the sealing member is generally the end that first receives the pipe liner. However, as mentioned above, it is contemplated that the mechanical fastener 18 be the same length or longer than the length of the sealing member 10. In these circumstances, the location of the mechanical fastener 18 does not matter. It is also contemplate that two mechanical fasteners 18 be utilized, with one at the proximal end 12 and the other at the distal end 14 of the sealing member 10.

Figure 4:
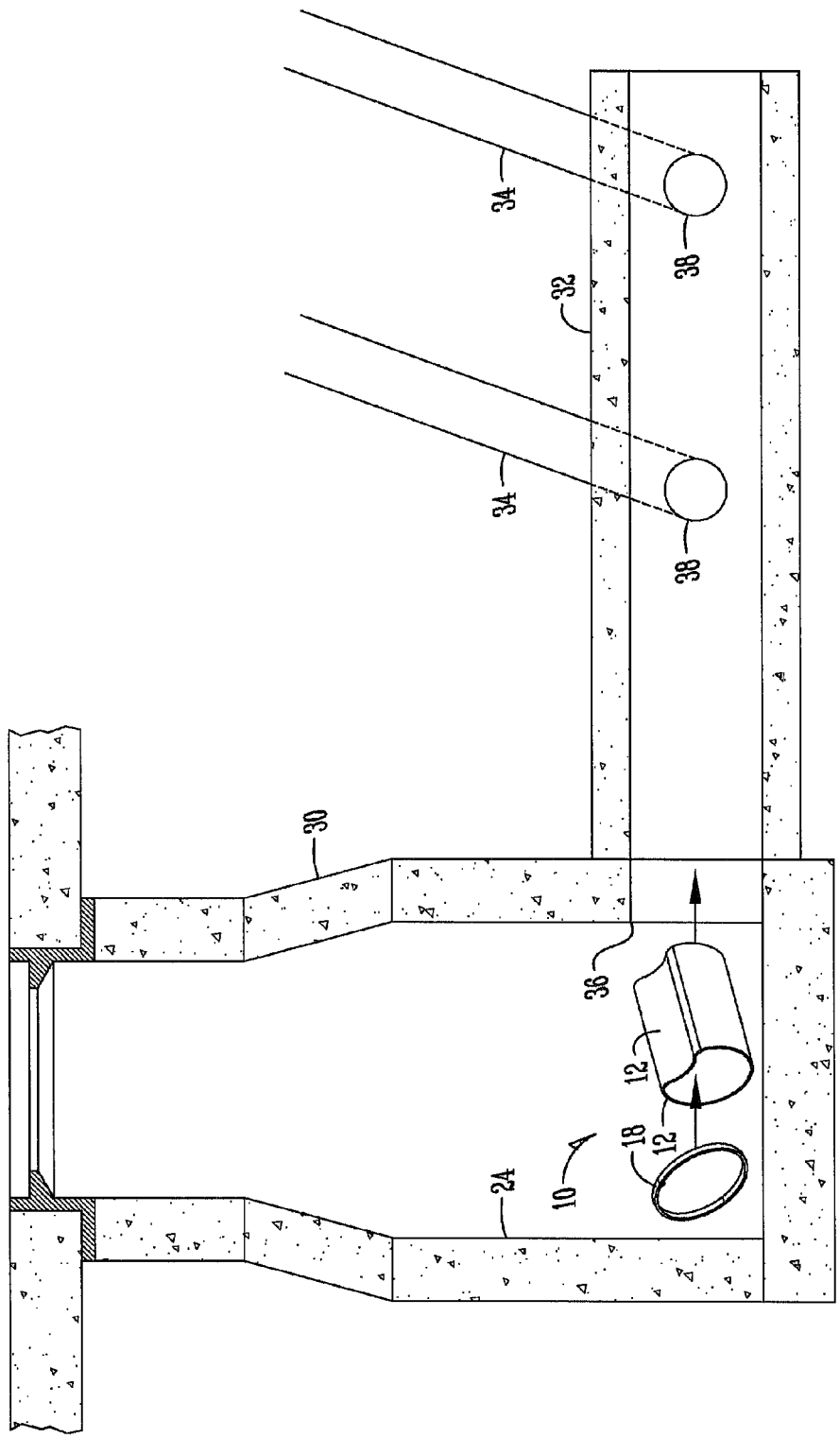
FIG. 4 is a sectional view of a sewer system including a manhole, main pipe, and service pipes illustrating where the sealing member of FIG. 1 is placed into the main pipe.

FIG. 4 is a sectional view of a sewer system including a manhole 30, main pipe 32, service pipes 34, a main pipe/manhole junction 36, and a main/service junction 38. FIG. 4 illustrates where the sealing member 10 is deformed into the strained conformation as depicted in FIG. 2, and placed into the main pipe 32 such that the proximal end 12 of the sealing member 10 is adjacent the main pipe/manhole junction 36. Additionally, a mechanical fastener 18 is shown near distal end 14 of sealing member 10. After the sealing member 10 is placed into the main pipe 32, the sealing member 10 is allowed to expand back into its initial tubular conformation. The elasticity of the sleeve 10 will cause the sleeve to revert from the strained conformation to the initial tubular conformation to fit the sleeve 10 against the wall of the main pipe 32. The sealing member 10 is secured against the wall of the main pipe 32 using the mechanical fastener 18. In certain embodiments, the sleeve 10 comprises a thin material (<10 mm) and has an outer diameter D1 substantially identical to the diameter of the main pipe. As such, the sealing member 10 allows for a liner to line the main pipe 32 without creating significant gaps or protrusions in the main pipe.

Figure 5:
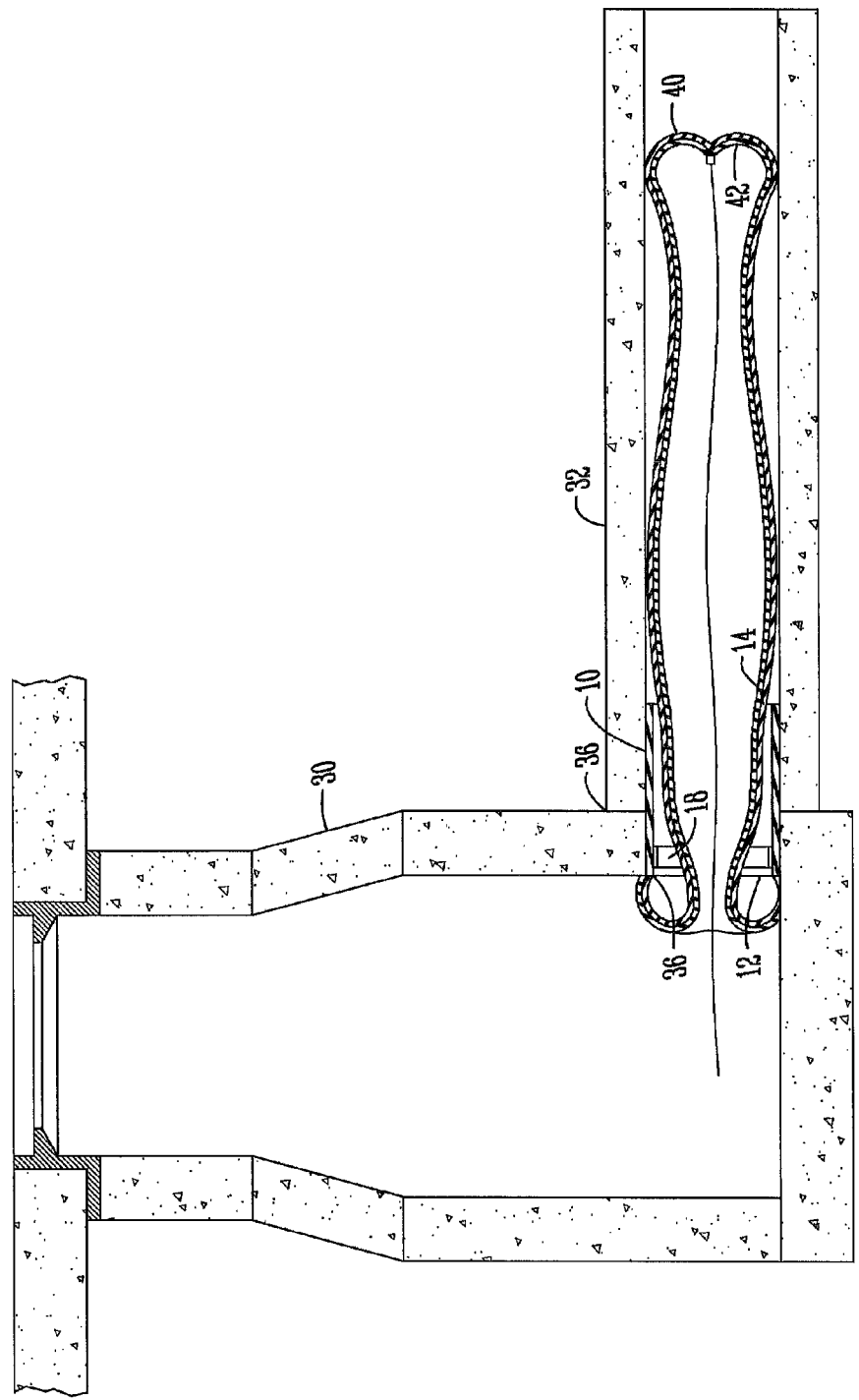
FIG. 5 is a perspective sectional view similar to FIG. 4, showing where a main liner is placed against the inner wall of the sealing member and against the walls of the main pipe by the use of an inflatable bladder.

FIG. 5 is a view similar to FIG. 4 showing a main liner 40 placed against the inner wall of the sealing member 10 and against the walls of the main pipe 32 using the mechanical fastener 18. After the sealing member 10 is placed into the main pipe 32, a cured-in-place main liner 40, impregnated with a resinous material capable of curing and hardening, is inserted through the sealing member 10 and against the member and the walls of the main pipe 32. As shown in FIG. 5, the main liner 40 is pressed against the wall of the main pipe 32 and the inner wall of the sealing member 10 and/or mechanical fastener 18 by the use of an inflatable bladder 42. There are several methods that may be employed to use the inflatable bladder 42. The inflatable bladder 42 may be inverted into the main pipe 32 after the main liner 40 is already within the main pipe 32; the inflatable bladder 42 may be inverted into the main pipe 32 along with the main liner 40; or the inflatable bladder 42 may be may be pulled into place by an operator and subsequently inflated by air or another fluid. Alternatively, the main liner 40 may have a fluid-impermeable coating on one side, allowing the main liner 40 to inflate without the use of a bladder.

Figure 6:
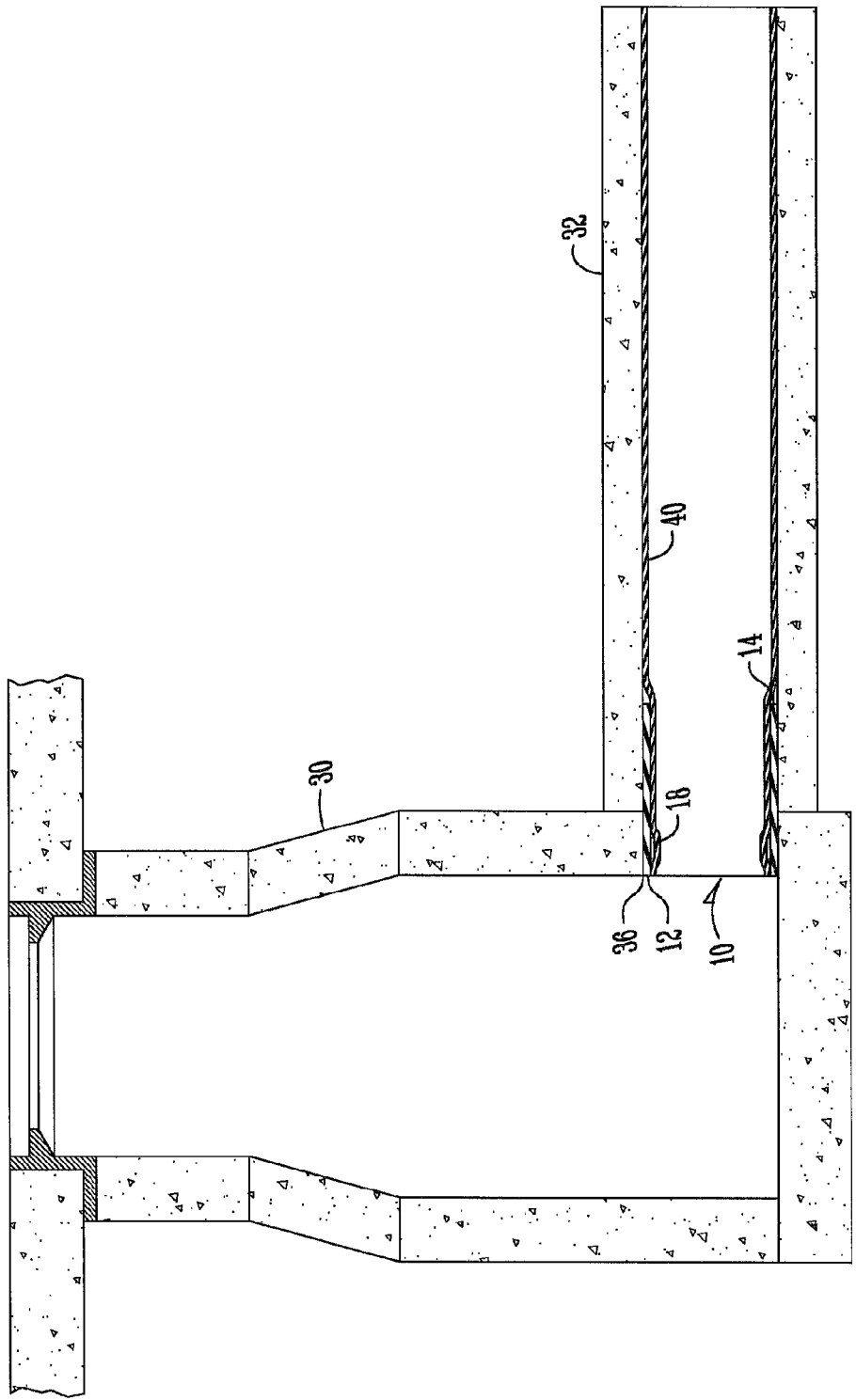
FIG. 6 is a view similar to FIG. 4 where the liner has cured.

FIG. 6 is a view similar to FIG. 5, showing the pipe system after the main liner 40 has cured. After the main liner 40 is pressed against the walls of the main pipe 32, the resinous material is allowed to cure and harden, holding the sealing member 10 in place between the main liner 40 and the main pipe 32. Even if the end of the main liner near the manhole were to shrink, the sealing member 10 acts to fill the annular space between the main liner 40 and the main pipe 32. Since a feature of the embodiment may include using a hydrophilic material for the sealing member, the hydrophilic material of the sealing member 10 will expand in the presence of water and/or extrude through voids or cracks in the main pipe 32, thus creating a full compression seal in the annular space between the main liner 40 and the main pipe/manhole junction 36.

In operation, the sealing member 10 works as follows. An assembly is provided, comprising a sealing member 10 having a proximal end 12 and an outer diameter D1 approximately equal to a main pipe diameter; a mechanical fastener 18; and a main liner 40 impregnated with a resinous material capable of curing and hardening. The sealing member is placed into a strained conformation so that the outer profile of the sealing member is reduced to fit inside of a main pipe. The sleeve is placed into a main pipe such that the proximal end 12 of the sleeve 10 is at the end of the main pipe 32 adjacent a junction 32 of a manhole 30 and a main pipe 32. Once placed within the main pipe, the sleeve is allowed to expand back into its initial tubular conformation. The sealing member may have a relatively tight fit within the pipe, as the outer diameter of the sealing member should have an outer profile that matches the inner profile of the pipe once placed against the pipe wall. An operator then secures the sealing member 10 against the wall of the main pipe 32 using the mechanical fastener 18. The main liner 40 is then inserted into the main pipe and through at least a portion of the sealing member 10. The main liner 40 is pressed against the inner wall of the sealing member under pressure, and the resinous material is allowed to cure and harden. In situations where the main liner has cured against the wall of the main pipe, the main liner may be cut with a saw or the like at the junctions with service pipes in order to reinstate service to the main pipe.

After the main liner 40 has cured, a manhole liner 150 (see FIGS. 9 and 10) impregnated with a resinous material capable of curing and hardening may be placed into the manhole adjacent the main pipe. The manhole liner is pressed against the walls of the manhole and the resinous material is allowed to cure and harden. The cured manhole liner is cut with a saw or the like around the junctions with other pipes, such as main pipes, to reinstate service to the manhole. Alternatively, other manhole liners may be utilized, as stated above. After installation of the sealing member, the main liner, and optionally the manhole liner, water can enter the annular space between the liners and the main pipe and/or manhole. As the sealing member may be constructed of a compressible material, a hydrophilic material, or a hydrophobic polyurethane grout material, the sealing member 10 may expand and/or swell upon contact with water, forming a compression seal and extruding through voids or cracks in the main pipe and/or manhole.

Once this process is complete, there may still be infiltration of water and sediment between the manhole liner and the walls of the manhole, entering from several points in the manhole. The common infiltration points will be the top of the manhole where the lid sits (or manhole "casting"), and the areas between the bottom pan and the barrel, the barrel and the cone, or the cone and the adjusting rings. Therefore, the assembly may further include additional sealing members 160, 164, 168, 172 (see FIGS. 8-10) having an outer diameter and configuration approximately equal to the inner aspects of a manhole, including the casting 131 diameter, or the diameter of the barrel 182, the cone 184, and the adjusting rings 186. In such a case, additional sealing members 160, 164, 168, 172 may be placed into the manhole 130 before placement of the manhole liner 150. The manhole liner 150 is placed against an inner wall or portion of the sealing member(s), the resinous material of the manhole liner is allowed to cure and harden, and any infiltration from the manhole is then staunched by the sealing member(s) placed between the manhole liner and manhole at areas prone to water infiltration or leakage.

In such a system, an advantage of using an additional sealing member at the manhole casting is that the sealing member will provide a cushion to the cured manhole liner for freeze-thaw cycles, as the manhole casting is susceptible to expansion and contraction due to the elements. The primary advantage of using additional sealing members at the junctions of the bottom pan, the barrel, the cone, and the adjusting rings is that most points of water and sediment infiltration/exfiltration are sealed using the sealing members. However, another point of water and sediment infiltration/exfiltration within the sewer system is the junctions of main and service pipes. As such, the assembly may further include a service liner to seal the service pipes. The use of a service liner is optionally considered for use with some embodiments of the present invention.

Figure 7:
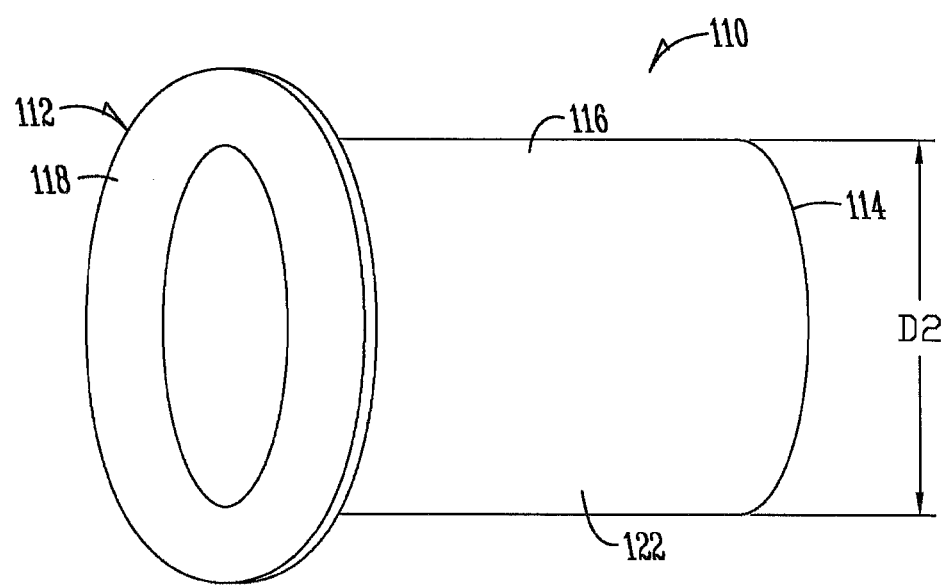
FIG. 7 is a perspective view of a sealing member in accordance with a second embodiment of the present invention where at least a portion of the proximal end of the sealing member includes a flange portion.

FIG. 7 is a perspective view of a sealing member 110 in accordance with an additional embodiment of the present invention. Sealing member 110 comprises a proximal end 112, a distal end 114, a body 116 there between, an outer wall 122 having a diameter D2, and a flange portion 118. As in the sealing member 10 of FIGS. 1-6, the sealing member 110 is a single, unitary piece that is made by a vulcanization, casting, or molding method, including but not limited to resin casting, injection molding, blow molding, or extrusion molding. The sealing member 110 may be molded directly into the form of a tube with a flange portion. However, alternative constructions are possible where the tube may be formed by taking a sheet of material and forming it into a tube, then fusing the material into a tube and attaching a flange portion by thermal bonding, adhesives, or other mechanical bonding methods. The body 116 and flange portion 118 comprise a generally uniform wall thickness along their respective lengths. The outer diameter D2 of the sealing member 110 is approximately equal to a diameter of a pipe for which the sealing member 110 is to be inserted. In addition, the sealing member 110 may also comprise the same materials as discussed above regarding the member 10.

With the sealing member 110 shown in FIG. 7, the flange portion 118 surrounds the entire periphery of the proximal end 112 of the sealing member 110. However, alternative constructions are possible, as the flange portion 118 may extend around a portion of the sealing member 110. The flange portion 118 acts to provide a seal to the majority of the area of a main pipe/manhole junction, providing a seal to the portion of the manhole adjacent the main pipe. The amount of flange portion 118 present on the sealing member will depend on the construction of the junction of the manhole and main pipe.

For instance, some main pipes are situated above the floor of the manhole, which is called a drop inlet. A drop inlet is depicted in FIGS. 7-10. Other main pipes are situated at the floor of the manhole, and a bench is added onto the manhole floor making a trench, allowing the contents of the main pipe to pass through the manhole in the area between the bench. For instances where the manhole utilizes a bench in the manhole floor, the flange portion 118 should surround the periphery of the sealing member 118 such that the flange portion contacts the wall of the manhole adjacent the main pipe. It is possible to construct a sealing member 110 such that a portion of the periphery of the distal end 112 includes a flange portion 118 by molding the sealing member 110 as such. It is preferred to produce a sealing member 110 where the flange portion 118 extends around the entire periphery of the proximal end 112, so that an installer may simply cut away a section of flange portion 118 with a knife, saw, or the like to tailor the sealing member 110 to a specific main pipe/manhole junction.

Figure 8:
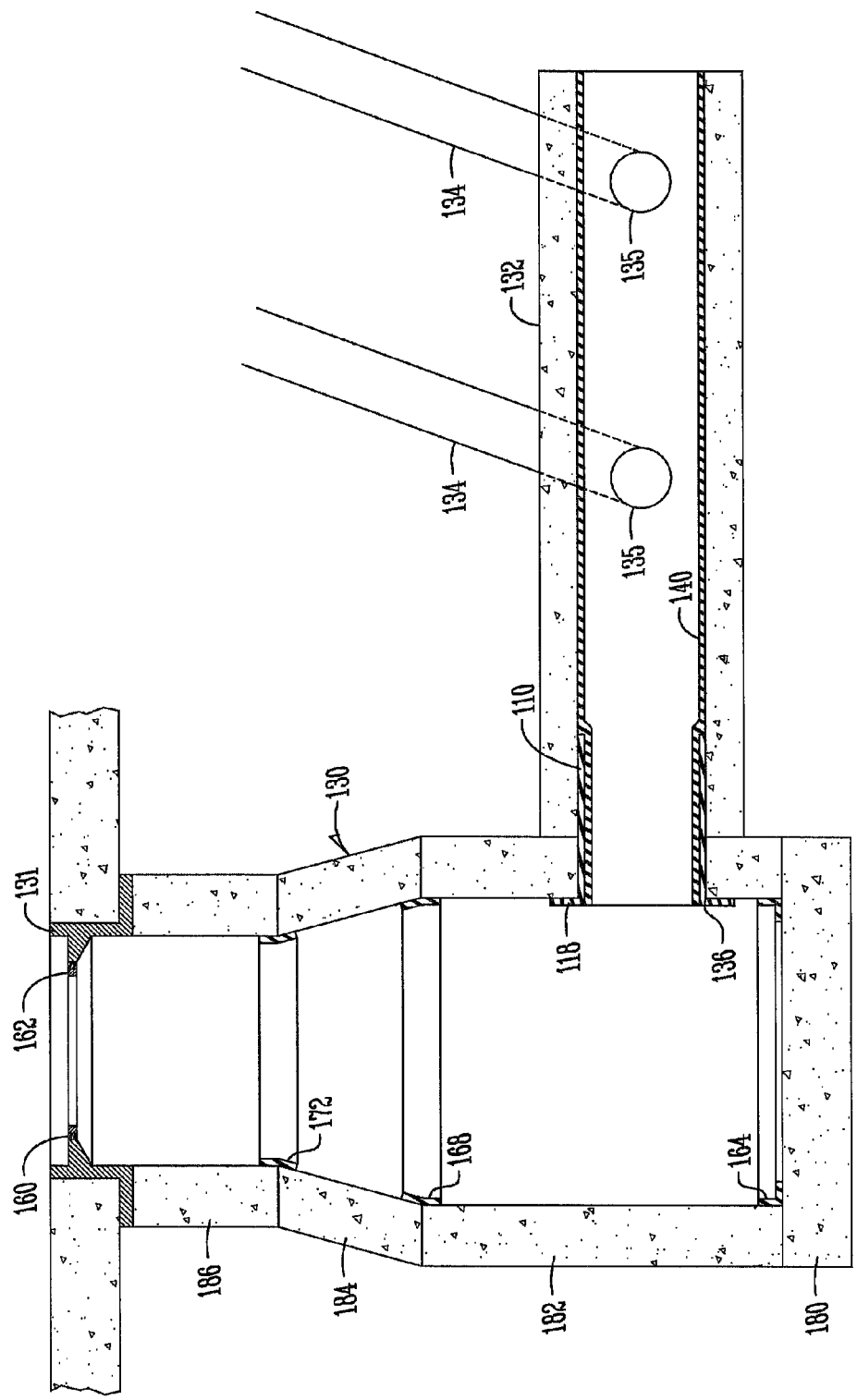
FIG. 8 is a sectional view of a sewer system including a manhole, main pipe, and service pipes illustrating where the sealing member of FIG. 6 is placed into the main pipe, where a liner has been placed against the walls of the tubular sleeve and the main pipe, and where the flange portion of the tubular sleeve abuts the wall of the manhole. Additionally, optional sealing members are retained within the manhole at areas prone to water infiltration.

FIG. 8 is a perspective sectional view of a sewer system including a manhole 130, main pipe 132, and service pipe 134 illustrating where the sealing member 110 is placed into the main pipe 132. FIG. 8 also shows that a main liner 140 has been cured against the wall of the sealing member 110 and the main pipe 132, and that the flange portion 118 of the sealing member 110 abuts the wall of the manhole 130. As discussed above in regards to FIGS. 1-6, the sealing member 110 may be placed into a strained conformation and placed into the main pipe 132 such that the proximal end 112 of the sealing member 110 is adjacent the main pipe/manhole junction 136. After the sealing member 110 is placed into the main pipe 132, the sealing member 110 is allowed to expand to its initial tubular conformation. A mechanical fastener or retaining ring may be placed on the inner wall of the sealing member 110 to secure it to the main pipe 132 such as described above regarding FIGS. 3-6. Then a main liner 140, impregnated with a resinous material capable of curing and hardening, is inserted into the main pipe 132 and pressed against the walls of the sealing member 110. The main liner 140 is then cured-in-place with or without the use of an inflatable bladder.

FIG. 8 further illustrates where additional sealing members 160, 164, 168, 172 are used to seal the manhole 130. The sealing members 160, 164, 168, 172 are shown as tubular sleeves having an outer diameter similar to the inner diameters of aspects of the manhole 130, including the casting 131 diameter, and the diameters of the barrel 182, the cone 184, and the adjusting rings 186. In such a case, the additional sealing members 160, 164, 168, 172 are placed into the manhole 130 before placement of the manhole liner 150. Sealing member 160 is placed at the manhole casting. The sealing member 164 is placed at the joint or junction of the bottom pan 180 and the barrel 182. It should be noted that the sealing member 164 may be positioned such that the member is L-shaped to cover both a portion of the barrel and the bottom pan. The sealing member 168 is placed between the barrel 182 and the cone 184. The sealing member 172 is placed between the cone 184 and the adjusting rings 186. A mechanical fastener or retaining ring 162 is shown as placed on the inner wall of the sealing member 160 to secure it to the manhole casting 131. Mechanical fasteners or retaining rings may also be used with sealing members 164, 168, or 172 to stabilize the sealing members before installation of a manhole liner (not shown).

Figure 9:
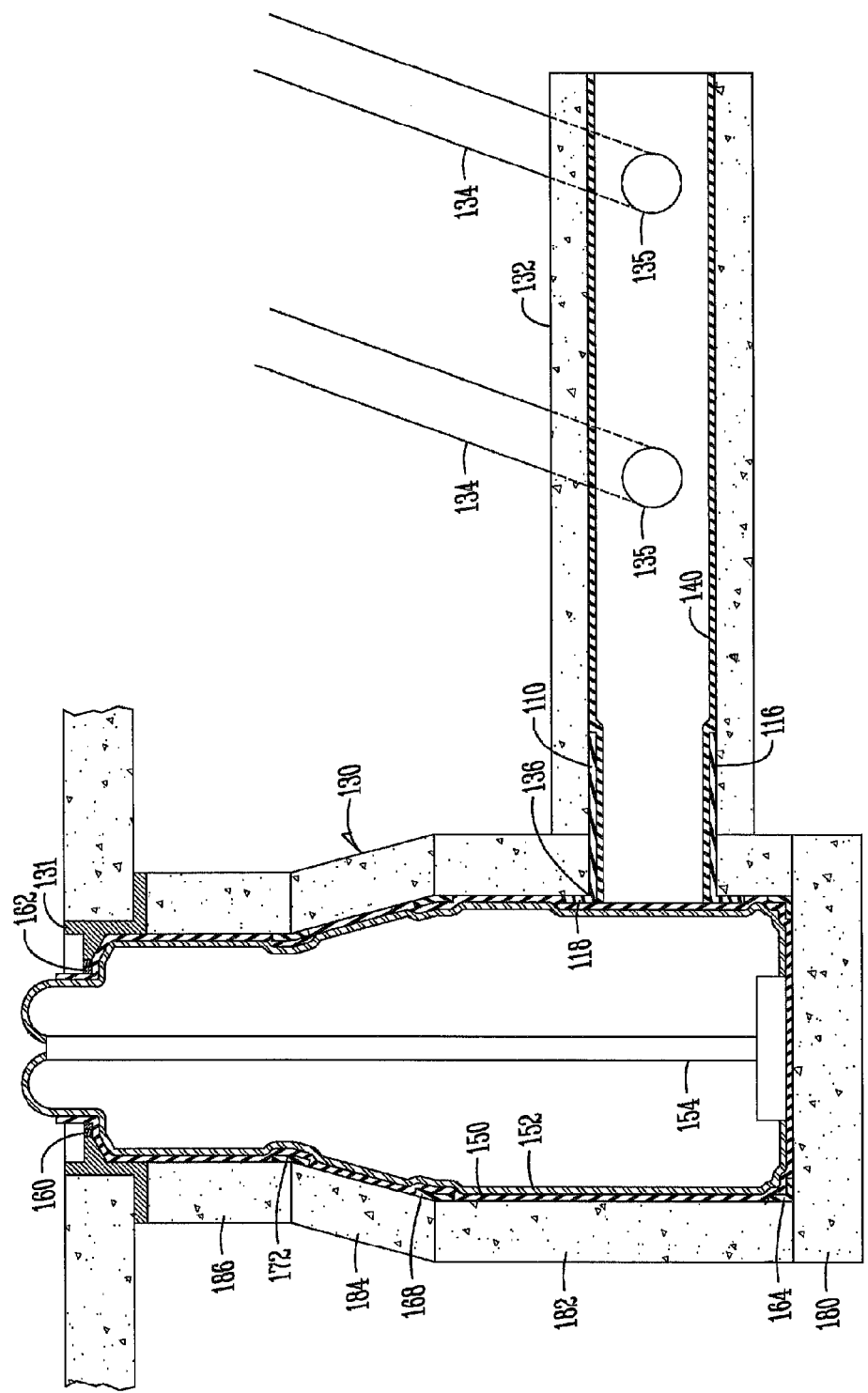
FIG. 9 is a view similar to FIG. 7, showing where a manhole liner is placed against the walls of the manhole and against the sealing members.

FIG. 9 is a view similar to FIG. 8, showing a manhole liner 150 impregnated with a resinous material capable of curing and hardening inserted into the manhole 130 and pressed against the wall of the manhole 130 as well as against the flange portion 118 of the sealing member 110 and the sealing members 160, 164, 168, 172. Once the main liner 140 has been installed, it is advantageous to install a manhole liner 150 usually within 48 hours of placing the main liner 140 into the main pipe where hydrophilic material is used in conjunction with sealing member 110. The time frame to install the manhole liner 150 is noted because the hydrophilic material used for the sealing member 110 will begin to swell at some point after placement within the main pipe 132. It is preferred to install the main liner 140 and manhole liner 150 over the sealing member before it has begun to swell, which is usually within 48 hours. However, longer time periods are within the scope of this invention, depending on the hydrophilicity of the material used for sealing member 110. The liners provide counter pressure to the sealing member 110, allowing the material of the sleeve to provide a compression seal to the main pipe 132 and walls of the manhole 130.

The manhole liner 150 of FIG. 9 is shown pressed against the wall of the manhole 130 by an inflatable manhole bladder 152. The manhole bladder 152 is inflated by inflation device 154, and the resinous material is allowed to cure and harden. The inflation device 154 and inflatable manhole bladder 152 are removed from the manhole, and service to the pipes in the manhole 130 is reinstated by the use of a saw or other cutting tool.

Figure 10:
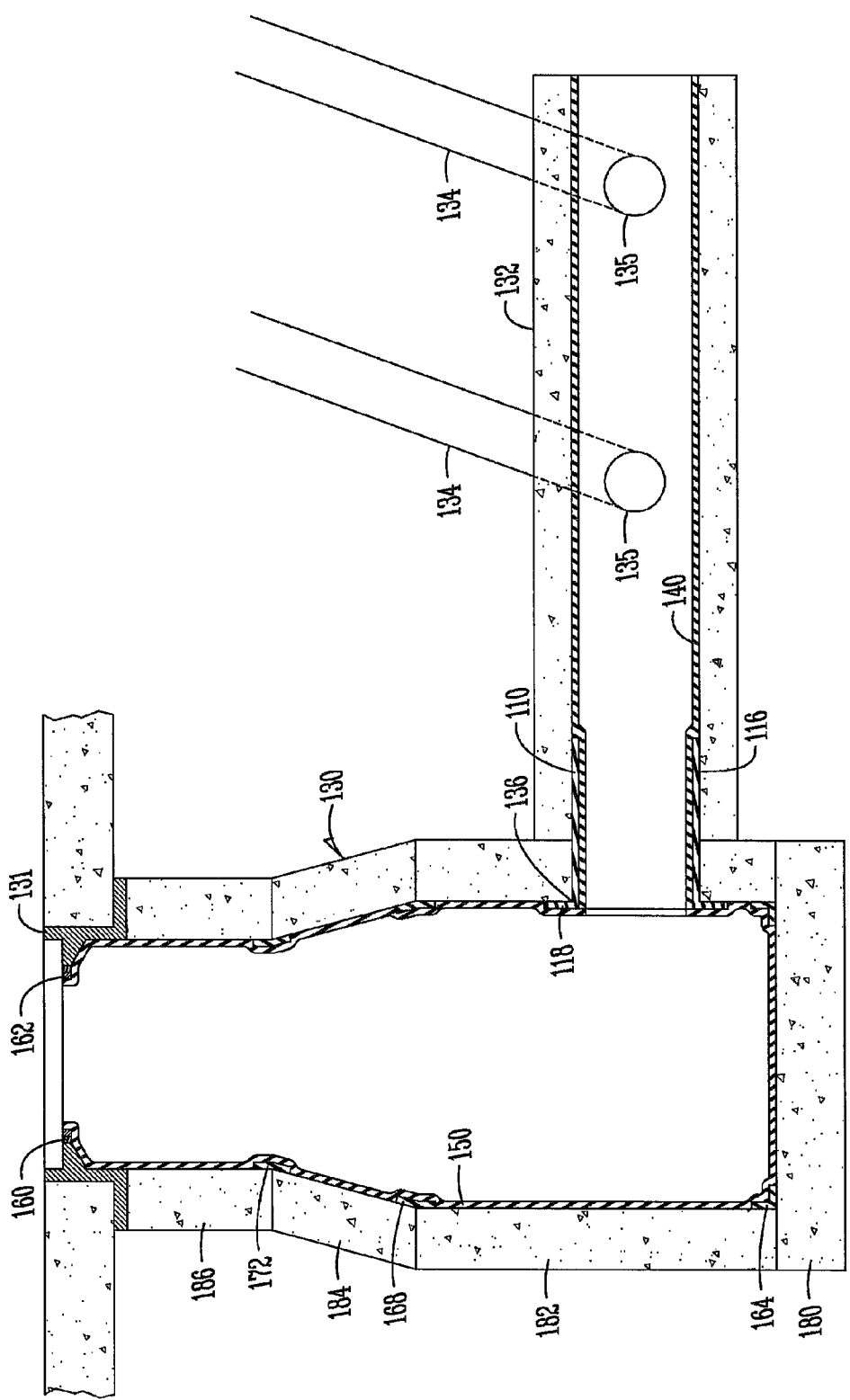
FIG. 10 is a sectional view of a sewer system having a junction between a main pipe and a manhole where the main liner and manhole liner have been installed in conjunction with sealing members to provide seals to the areas prone to water infiltration within the sewer system.

FIG. 10 is a sectional view of the main pipe/manhole junction 136 where the main liner 140 and manhole liner 150 have been installed in conjunction with the sealing members 110, 160, 164, 168, 172. The figure shows that the manhole liner 150 comes into contact or near contact with the main liner 140 at the main pipe/manhole junction 136, with the body 116 of the sealing member 110 against the wall of the main pipe 132 and the flange portion 118 against the wall of the manhole 130.

In operation, the sealing member 110 is used as follows. An assembly is provided. The assembly comprises a sealing member having a flange portion, a proximal end, a distal end, a body between the ends, and an outer diameter approximately equal to a main pipe diameter; and a main liner impregnated with a resinous material capable of curing and hardening. The sealing member is constructed of a hydrophilic material having a hardness between 0 Shore A Durometer Scale and 80 Shore D Durometer Scale. However, it is preferred that the sealing member is a tubular sleeve comprising a hydrophilic neoprene rubber having a hardness of less than 90 Shore A Durometer Scale. The distal end of the sealing member is deformed to a strained, non-tubular conformation so that the outer profile of the body of the sleeve is reduced to fit inside the main pipe. The sealing member is placed into a main pipe such that the proximal end of the sealing member is adjacent a junction of a manhole and a main pipe and the flange portion abuts the wall of the manhole. Once placed within the main pipe, the body of the elastic sealing member is allowed to revert and expand to its initial tubular conformation. The sealing member may then be secured to the pipe using a mechanical fastener through the sealing member, on the inner wall of the sealing member, or an adhesive on the outer wall of the sealing member. The sealing member should have a relatively tight fit within the pipe. The main liner is then placed into the main pipe through the sealing member. The main liner is pressed against the inner wall of the sealing member, and the resinous material is allowed to cure and harden. In situations where the main liner has cured against the walls of the main pipe to cover openings of service pipes, the main liner may be cut with a saw or the like at the junctions with service pipes in order to reinstate service to the main pipe. Within 48 hours after curing the main liner, a manhole liner impregnated with a resinous material capable of curing and hardening is placed into the manhole adjacent the main pipe.

In operation of providing a liner to a manhole or other underground structure, the sealing members are pressed against the wall of the manhole at areas prone to water infiltration or leakage. An installer may expand a retaining ring against the sealing members or use a drill, nail gun, or hammer for the installation of mechanical fasteners to retain the sealing members against the wall of the manhole. A manhole liner comprising a material capable of curing or hardening is then pressed against the walls of the manhole and the sealing members. Where the manhole joins a main pipe and a sealing member having a flange portion has been installed, the manhole liner will be placed against the flange portion of the sealing member. The material capable of curing or hardening of the manhole liner is allowed to cure and harden. The cured manhole liner is cut with a saw or the like around the junctions with other pipes to reinstate service to the manhole. After installation of the sealing member and manhole liner, water may seek to enter any annular space between the manhole liner and the manhole. As the sealing member(s) may be constructed of a hydrophilic material, the material will expand and/or swell upon contact with water, extruding through voids or cracks in the manhole to seal the manhole.

An optional feature of the embodiments of the present invention includes adding an adhesive to the outer wall of one or all of the sealing members. The adhesive may cover at least a portion of the outer wall, to assist in holding the sealing member within the main pipe, manhole, or other structure. Types of adhesives for use with the present invention include but are not limited to pressure-sensitive adhesives, double-sided tapes, or adhesive foams. It is preferred to include a paper or polymeric backing onto the adhesive, so that an installer may quickly peel the backing, insert the sealing member into the pipe, manhole, or other structure, and press the adhesive against the pipe or manhole. It should also be noted that a sealing member having a flange portion may be secured to a main pipe/manhole junction by including the adhesive on the flange portion of the sealing member that abuts the wall of the manhole.

The present invention has many attendant advantages. First, the present invention provides a solution to the problem of shrinkage of cured-in-place pipe liners or other pipe liners creating annular space between the liner and the host structure. Secondly, the present invention provides a method that ensures the area surrounding a junction of elements is sealed evenly at areas prone to water infiltration with a material that provides a compression seal between the pipe liner and the pipe and/or manhole. Thirdly, the present invention provides a method and apparatus that provides a fast and neat installation of a member to seal annular space, without the need for spraying methods to attach the material to the host pipe.

It should be understood that various changes and modifications to the presently preferred embodiment described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. An apparatus for sealing a manhole having an inner wall, comprising:
   a sealing member having an outer profile approximately equal to an inner manhole wall diameter;
   wherein the sealing member is positioned adjacent to the inner wall of the manhole to provide sealing at the location of placement; and
   wherein the sealing member is comprised of at least one of a hydrophilic material, a hydrophobic material, an absorbent material, and a compressible material.

2. The apparatus of claim 1 wherein the sealing member is a tubular sleeve.

3. The apparatus of claim 1 further comprising a mechanical fastener adapted to retain the sealing member against the inner wall of the manhole.

4. The apparatus of claim 3 wherein the mechanical fastener comprises a retaining ring.

5. The apparatus of claim 1 wherein the hydrophilic material is a grout.

6. The apparatus of claim 1 wherein the hydrophilic material is a paste.

7. The apparatus of claim 1 wherein the hydrophobic material is a grout.

8. The apparatus of claim 1 wherein the hydrophobic material is a paste.

9. An assembly for sealing a manhole and an adjacent pipe, comprising:
   a sealing member having an outer profile approximately equal to a manhole diameter, wherein the sealing member is comprised of at least one of a hydrophilic paste, a hydrophilic grout, a hydrophobic material, an absorbent material, and a compressible material;
   and a manhole liner, wherein the sealing member is positioned between the manhole liner and the manhole.

10. The apparatus of claim 9 wherein the hydrophobic material is a grout.

11. The apparatus of claim 9 wherein the hydrophobic material is a paste.

12. A method for sealing a manhole having an interior wall, the method comprising:
    providing a sealing member having an outer profile approximately equal to a diameter of the manhole, wherein the sealing member is comprised of at least one of hydrophilic paste, a hydrophilic grout, a hydrophobic material, an absorbent material, and a compressible material;
    positioning the sealing member into the manhole adjacent the interior wall;
    providing a manhole liner; and
    pressing the manhole liner against the sealing member and at least a portion of the interior wall of the manhole.

13. The method of claim 12 wherein the manhole liner is impregnated with a resinous material capable of curing and hardening.

14. The method of claim 12 further comprising securing the sealing member within the manhole using an adhesive material.

15. The method of claim 12 further comprising securing the sealing member within the manhole using a mechanical fastener positioned against an inner wall of the sealing member.

16. The apparatus of claim 12 wherein the hydrophobic material is a grout.

17. The apparatus of claim 12 wherein the hydrophobic material is a paste.

* * * * *